United States Patent
Tokuhiro (10) Patent No.: US 10,484,229 B2
(45) Date of Patent: Nov. 19, 2019

(54) PAM RECEPTION CIRCUIT AND RECEPTION APPARATUS

(71) Applicant: FUJITSU LIMITED, Kawasaki-shi, Kanagawa (JP)

(72) Inventor: Noriyuki Tokuhiro, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 158 days.

(21) Appl. No.: 15/884,436

(22) Filed: Jan. 31, 2018

(65) Prior Publication Data

US 2018/0227162 A1   Aug. 9, 2018

(30) Foreign Application Priority Data

Feb. 3, 2017 (JP) .................. 2017-018501

(51) Int. Cl.
| | |
|---|---|
| *H04L 27/38* | (2006.01) |
| *H04L 27/36* | (2006.01) |
| *H04B 14/02* | (2006.01) |
| *H04L 25/49* | (2006.01) |
| *H04B 10/54* | (2013.01) |

(52) U.S. Cl.
CPC ....... *H04L 27/3809* (2013.01); *H04B 10/541* (2013.01); *H04B 14/023* (2013.01); *H04L 25/49* (2013.01); *H04L 27/361* (2013.01)

(58) Field of Classification Search
CPC ... H04L 27/06; H04L 27/3809; H04L 27/361; H04L 25/49; H04B 10/695; H04B 10/541
See application file for complete search history.

(56) References Cited

U.S. PATENT DOCUMENTS

| | | | |
|---|---|---|---|
| 5,973,957 A | 10/1999 | Tedrow | |
| 5,982,662 A | 11/1999 | Kobayashi et al. | |
| 2015/0312063 A1* | 10/2015 | Toifl | H04L 25/03057 |
| | | | 375/233 |

FOREIGN PATENT DOCUMENTS

| | | |
|---|---|---|
| JP | 10-302486 | 11/1998 |
| JP | 2001-516932 | 10/2001 |

* cited by examiner

*Primary Examiner* — Jeffrey M Shin
(74) *Attorney, Agent, or Firm* — Fujitsu Patent Center (57) ABSTRACT

A PAM reception circuit includes a first comparison circuit that outputs a first bit value in two-bit values based on a result of a comparison between a reception signal of pulse amplitude modulation 4 in which the two-bit values are associated with four potential levels divided by three threshold values by gray codes and a first threshold value which is a center of the three threshold values, an absolute value circuit that outputs an absolute value of a difference between the reception signal and the first threshold value or a negative value obtained by inverting a sign of the absolute value from a positive sign to a negative sign, and a second comparison circuit that outputs a second bit value in the two-bit values based on a result of a comparison between a second threshold value which is larger than the first threshold value in the three threshold values.

7 Claims, 9 Drawing Sheets

| Inputs | | | Outputs | |
|---|---|---|---|---|
| VH | VM | VL | MSB | LSB |
| X | X | 0 | 0 | 0 |
| X | 0 | 1 | 0 | 1 |
| 0 | 1 | 1 | 1 | 1 |
| 1 | 1 | 1 | 1 | 0 |

X:DON'T CARE

PAM RECEPTION CIRCUIT AND RECEPTION APPARATUS

CROSS-REFERENCE TO RELATED APPLICATION

This application is based upon and claims the benefit of priority of the prior Japanese Patent Application No. 2017-18501, filed on Feb. 3, 2017, the entire contents of which are incorporated herein by reference.

FIELD

The embodiments discussed herein are related to a Pulse Amplitude Modulation (PAM) reception circuit and a reception apparatus.

BACKGROUND

High-speed serial communication is performed as a method for transferring large volume data between Large Scale Integrated circuits (LSIs) or between network apparatuses. In recent years, a transmission standard of the high-speed serial communication having a transmission speed of 56 Gbps has been developed in Optical Internetworking Forum (OIF) or the like. In the transmission standard, employment of a multilevel transmission technique referred to as Pulse Amplitude Modulation 4 (PAM4) instead of Non Return to Zero (NRZ) has been proposed.

NRZ is a technique of dividing signal potentials into a high (H) level and a low (L) level and transmitting the signal potentials of the H level and the signal potentials of the L level which are associated with one-bit logical value "1" and "0", respectively. On the other hand, PAM4 is a technique of dividing signal potentials into four potential levels and transmitting the signal potentials in the four potential levels which are associated with respective two-bit logical values. In PAM4, when an amount of information in NRZ is to be similarly transmitted, a baud rate of a signal may be reduced to half. The higher a frequency of a signal to be transmitted becomes, the larger a loss of a transmission path, such as a printed circuit or a cable, becomes. If the baud rate is lowered, a signal band (a Nyquist frequency) is lowered, and therefore, a transmission loss may be reduced.

Note that, in PAM4, use of a gray code in association between the two-bit logical values and the four potential levels has been proposed. The gray code is characterized in that a signal distance between adjacent codes is 1. In a case where four potential levels are denoted by L0, L1, L2, and L3 in ascending order, "00", "01", "11", and "10" are associated with L0, L1, L2, and L3, respectively. Since the gray code is used, a case where a lead error to an adjacent code which occurs on a reception side since a signal potential is changed due to application of noise at a time of signal transmission is recognized as two-bit error is suppressed.

Meanwhile, in general PAM reception circuits which receive a signal of PAM4, three comparison circuits which compare the received signal with individual three threshold values are used to determine one of the four potential levels which correspond to the received signal. Therefore, in the PAM reception circuits, the number of comparison circuits is larger than the number of reception circuits which receive signals of NRZ, and accordingly, power consumption is also increased.

The followings are reference documents.
[Document 1] Japanese Laid-open Patent Publication No. 10-302486 and
[Document 2] Japanese National Publication of International Patent Application No. 2001-516932.

SUMMARY

According to an aspect of the invention, a PAM reception circuit includes a first comparison circuit that outputs a first bit value in two-bit values based on a result of a comparison between a reception signal of pulse amplitude modulation 4 in which the two-bit values are associated with four potential levels divided by three threshold values by gray codes and a first threshold value which is a center of the three threshold values, an absolute value circuit that outputs an absolute value of a difference between the reception signal and the first threshold value or a negative value obtained by inverting a sign of the absolute value from a positive sign to a negative sign, and a second comparison circuit that outputs a second bit value in the two-bit values based on a result of a comparison between a second threshold value which is larger than the first threshold value in the three threshold values and the absolute value or a result of a comparison between a third threshold value which is smaller than the first threshold value in the three threshold values and the negative value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of the present disclosure will be described hereinafter with reference to the accompanying drawings.

First Embodiment

Figure 1:
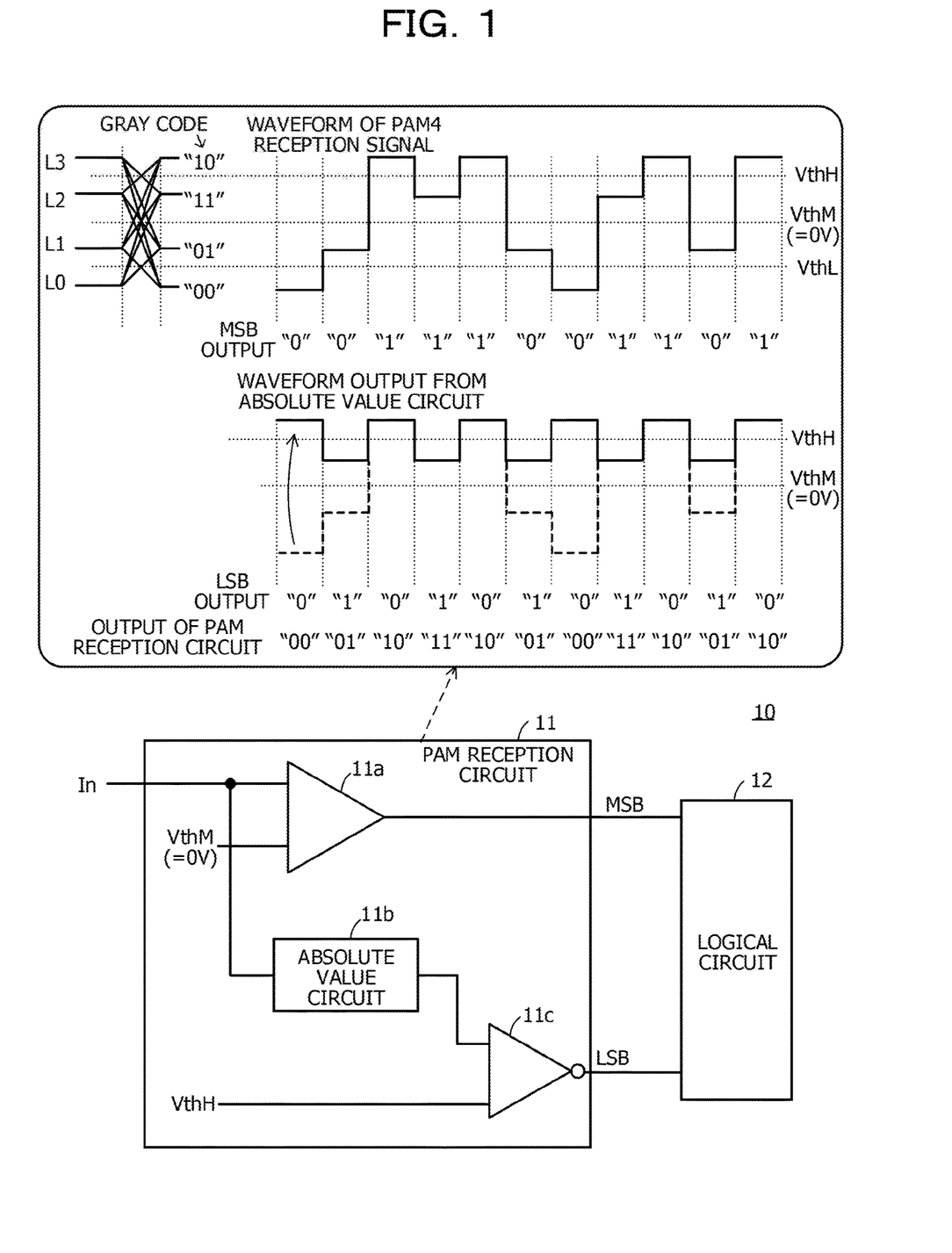
FIG. 1 is a diagram illustrating an example of a PAM reception circuit and an example of a reception apparatus according to a first embodiment.

FIG. 1 is a diagram illustrating an example of a PAM reception circuit and an example of a reception apparatus according to a first embodiment.

A reception apparatus 10 according to the first embodiment includes a PAM reception circuit 11 and a logical circuit 12.

The PAM reception circuit 11 receives a reception signal In of PAM4 which is divided into four potential levels by three threshold values which are individually associated with two-bit values of a gray code and determines and outputs the two-bit values.

Hereinafter, it is assumed that the four potential levels of the reception signal In of PAM4 are denoted by L0, L1, L2, and L3 in ascending order, and "00", "01", "11", and "10" are associated with L0, L1, L2, and L3, respectively. Note that the threshold value of a boundary between L0 and L1 is denoted by VthL, the threshold value of a boundary between L1 and L2 is denoted by VthM, and the threshold value of a boundary between L2 and L3 is denoted by VthH. A difference (a voltage difference) between the threshold values VthM and VthH is equal to a difference between the threshold values VthM and VthL.

The center threshold value VthM in the three threshold values VthL, VthM, and VthH is a center in change of amplitude of the reception signal In and is 0V hereinafter. For example, the threshold value VthM may be set to 0V when a direct current component is cut by a capacitor using a differential signal when a PAM4 signal is transmitted. Furthermore, assuming that a voltage of the reception signal In of PAM4 is changed from −1 to +1, the threshold value VthH is +$\frac{2}{3}$ and the threshold value VthL is −$\frac{2}{3}$.

When receiving the two-bit values which are results of the determination of the reception signal output from the PAM reception circuit 11, the logical circuit 12 performs various logical operations using one of the two-bit values as a most significant bit (MSB) and the other as a least significant bit (LSB) in accordance with gray codes.

The PAM reception circuit 11 includes a comparison circuit 11a, an absolute value circuit 11b, and a comparison circuit 11c.

The comparison circuit 11a outputs a first bit value in the two-bit values based on a result of a comparison between the reception signal In of the PAM4 and the threshold value VthM. In the example of FIG. 1, the first bit value is the MSB. In the example of the PAM reception circuit 11 in FIG. 1, when the reception signal In is larger than the threshold value VthM, the comparison circuit 11a outputs "1" as the first bit value (a logical value) whereas when the reception signal In is smaller than the threshold value VthM, the comparison circuit 11a outputs "0" as the first bit value. For example, "1" is a power source voltage and "0" is 0V.

The absolute value circuit 11b outputs an absolute value of a difference between the reception signal In and the threshold value VthM. When the threshold value VthM is 0V, an absolute value of the reception signal In is output.

Figure 2:
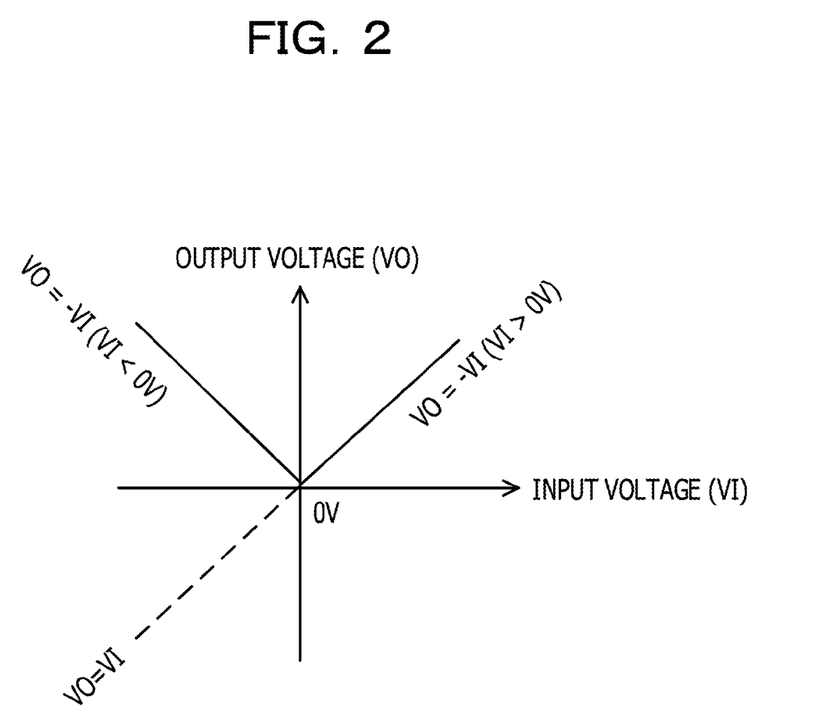
FIG. 2 is a diagram illustrating the relationship of an example of an input voltage and an example of an output voltage in an absolute value circuit.

FIG. 2 is a diagram illustrating the relationship between an example of an input voltage and an example of an output voltage in the absolute value circuit 11b. An axis of abscissae denotes an input voltage (VI) and an axis of ordinates denotes an output voltage (VO).

As illustrated in FIG. 2, when VI is larger than 0V, VO is equal to VI whereas when VI is smaller than 0V, VO is equal to −VI.

The comparison circuit 11c outputs a second bit value in the two-bit values in accordance with a result of a comparison between the absolute value output from the absolute value circuit 11b and the threshold value VthH which is larger than the threshold value VthM. In the example of FIG. 1, the second bit value is the LSB. Note that the threshold value VthH is obtained when the power source voltage is subjected to resistance voltage division, for example. In the example of the PAM reception circuit 11 in FIG. 1, when the absolute value is larger than the threshold value VthH, the comparison circuit 11c outputs "0" as the second bit value whereas when the absolute value is smaller than the threshold value VthH, the comparison circuit 11c outputs "1" as the second bit value.

Note that, when the threshold value VthM is not 0V, the comparison circuit 11c outputs the second bit value in the two-bit values in accordance with a result of a comparison between a value obtained by adding the absolute value to the threshold value VthM and the threshold value VthH. In this case, an addition circuit which adds the absolute value to the threshold value VthM is used, for example.

In the example of the PAM reception circuit 11 of FIG. 1, assuming that the first bit value output from the comparison circuit 11a is the MSB and the second bit value output from the comparison circuit 11c is the LSB, two-bit values corresponding to the potential levels (L0 to L3) of the reception signal In are obtained.

Hereinafter, an example of an operation of the PAM reception circuit 11 will be described.

In FIG. 1, an example of a waveform of the reception signal In of PAM4 and an example of an output waveform of the absolute value circuit 11b are illustrated. The output waveform of the absolute value circuit 11b is obtained by inverting a waveform of the reception signal In in a negative voltage into a positive voltage.

When the reception signal In has the potential level of L0, the reception signal In is smaller than the threshold value VthM, and therefore, the first bit value output from the comparison circuit 11a is "0". Here, the absolute value output from the absolute value circuit 11b is larger than the threshold value VthH. Therefore, the second bit value output from the comparison circuit 11c is "0". Assuming that the first bit value output from the comparison circuit 11a is the MSB and the second bit value output from the comparison circuit 11c is the LSB, the two-bit value output from the PAM reception circuit 11 is "00".

When the reception signal In has the potential level of L1, the reception signal In is smaller than the threshold value VthM, and therefore, the first bit value output from the comparison circuit 11a is "0". Here, the absolute value output from the absolute value circuit 11b is smaller than the threshold value VthH. Therefore, the second bit value output from the comparison circuit 11c is "1". Assuming that the first bit value output from the comparison circuit 11a is the MSB and the second bit value output from the comparison circuit 11c is the LSB, the two-bit value output from the PAM reception circuit 11 is "01".

When the reception signal In has the potential level of L2, the reception signal In is larger than the threshold value VthM, and therefore, the first bit value output from the comparison circuit 11a is "1". Here, the absolute value output from the absolute value circuit 11b is smaller than the threshold value VthH. Therefore, the second bit value output from the comparison circuit 11c is "1". Assuming that the first bit value output from the comparison circuit 11a is the MSB and the second bit value output from the comparison circuit 11c is the LSB, the two-bit value output from the PAM reception circuit 11 is "11".

When the reception signal In has the potential level of L3, the reception signal In is larger than the threshold value VthM, and therefore, the first bit value output from the comparison circuit 11a is "1". Here, an absolute value output from the absolute value circuit 11b is larger than the threshold value VthH. Therefore, the second bit value output from the comparison circuit 11c is "0". Assuming that the first bit value output from the comparison circuit 11a is the MSB and the second bit value output from the comparison circuit 11c is the LSB, the two-bit value output from the PAM reception circuit 11 is "10".

As described above, the two-bit values corresponding to the potential levels (L0 to L3) of the reception signal In may be output (reproduced) in individual time slots.

According to the PAM reception circuit 11 described above, since the number of comparison circuits is 2, power consumption and a circuit size may be reduced when compared with a PAM reception circuit which determines two-bit values of the reception signal In using three comparison circuits. Hereinafter, an example of the PAM reception circuit using three comparison circuits will be illustrated as a comparative example.

Comparative Example

Figure 3:
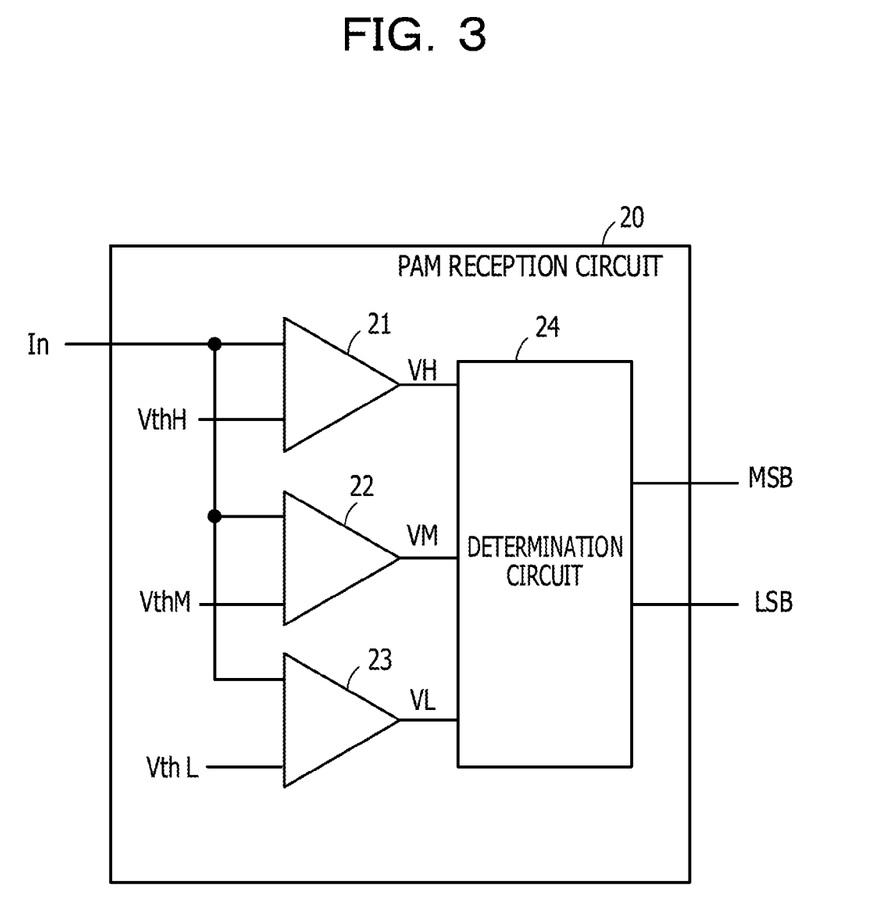
FIG. 3 is a diagram illustrating an example of the PAM reception circuit employing three comparison circuits.

FIG. 3 is a diagram illustrating an example of the PAM reception circuit employing three comparison circuits.

A PAM reception circuit 20 includes three comparison circuits 21 to 23 and a determination circuit 24.

The comparison circuit 21 outputs a result VH of a comparison between a reception signal In and a threshold value VthH. When the reception signal In is larger than the threshold value VthH, the comparison result VH is "1" whereas when the reception signal In is smaller than the threshold value VthH, the comparison result VH is "0".

The comparison circuit 22 outputs a result VM of a comparison between the reception signal In and a threshold value VthM. When the reception signal In is larger than the threshold value VthM, the comparison result VM is "1" whereas when the reception signal In is smaller than the threshold value VthM, the comparison result VM is "0".

The comparison circuit 23 outputs a result VL of a comparison between the reception signal In and a threshold value VthL. When the reception signal In is larger than the threshold value VthL, the comparison result VL is "1" whereas when the reception signal In is smaller than the threshold value VthL, the comparison result VL is "0".

The determination circuit 24 outputs an MSB and an LSB based on the comparison results VH, VM, and VL.

Figure 4:
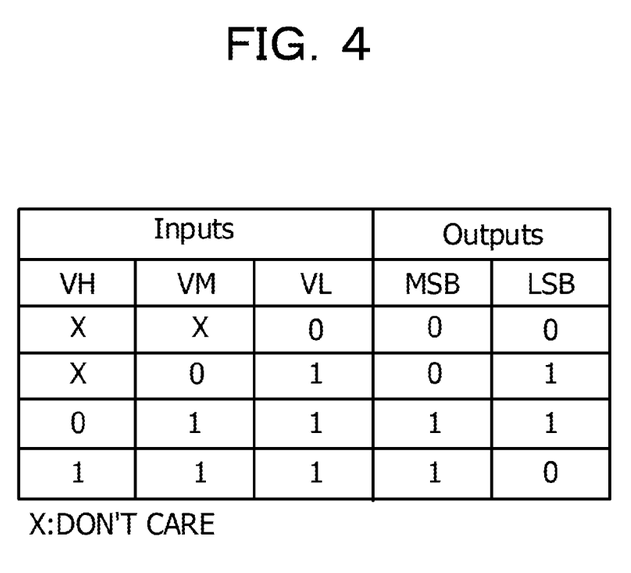
FIG. 4 is a truth table indicating a logical operation of a determination circuit.

FIG. 4 is a truth table indicating a logical operation of the determination circuit 24.

"X" denotes "don't care". When the comparison result VL is "0", the MSB and the LSB are "0", and when the comparison result VL is "1" and the comparison result VM is "0", the MSB is "0" and the LSB is "1". When the comparison result VL is "1", the comparison result VM is "1", and the comparison result VH is "0", the MSB and the LSB are "1", and when the comparison result VL is "1", the comparison result VM is "1", and the comparison result VH is "1", the MSB is "1" and the LSB is "0".

Even the PAM reception circuit 20 described above may output (reproduce) the two-bit values of the reception signal In of PAM4 which is associated with the two-bit values by the described gray codes. However, since the three comparison circuits 21 to 23 and the determination circuit 24 are disposed, power consumption and a circuit size are increased.

On the other hand, the PAM reception circuit 11 of the first embodiment illustrated in FIG. 1 includes only the two comparison circuits, and therefore, power consumption may be reduced. Furthermore, the number of comparison circuits is small and the determination circuit 24 is not disposed, and accordingly, a circuit size and a layout size may be reduced.

Note that the absolute value circuit 11b may output a negative value obtained by inverting a sign of the absolute value from positive to negative, and the comparison circuit 11c may output a second bit value in the two-bit values based on a result of a comparison between the negative value and the threshold value VthL which is smaller than the threshold value VthM. The negative value may be generated by an inverting amplifier. The comparison circuit 11c outputs "0" when the negative value is smaller than the threshold value VthL and outputs "1" when the negative value is larger than the threshold value VthL. Accordingly, an effect of the foregoing example using the threshold value VthH is similarly obtained. Note that, when the threshold value VthM is not 0V, the comparison circuit 11c outputs the second bit value in the two-bit values based on a result of a comparison between a value obtained by subtracting the absolute value from the threshold value VthM and the threshold value VthL. In this case, a subtraction circuit which subtracts the absolute value from the threshold value VthM is used, for example.

The gray codes are also not limited to the foregoing example. For example, "00", "10", "11", and "01" may be associated with the four potential levels L0, L1, L2, and L3, respectively. In this case, the logical circuit 12 uses the first bit value output from the comparison circuit 11a as the LSB and the second bit value output from the comparison circuit 11c as the MSB. Alternatively, "11", "10", "00", and "01" may be associated with the four potential levels L0, L1, L2, and L3, respectively. In this case, the comparison circuit 11a outputs "0" when the reception signal In is larger than the threshold value VthM and outputs "1" when the reception signal In is smaller than the threshold value VthM as the MSB. Then the comparison circuit 11c outputs "1" when the absolute value is larger than the threshold value VthH and outputs "0" when the absolute value is smaller than the threshold value VthH.

Second Embodiment

Figure 5:
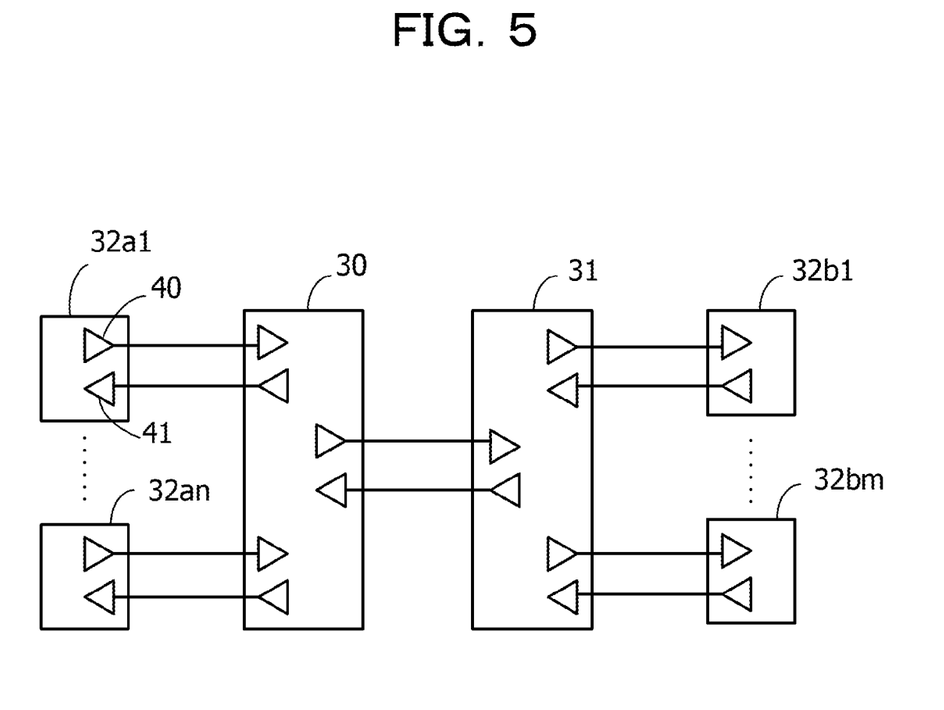
FIG. 5 is a diagram illustrating an example of a network using a reception apparatus according to a second embodiment.

FIG. 5 is a diagram illustrating an example of a network using a reception apparatus according to a second embodiment.

The network includes network apparatuses 30 and 31 and terminal apparatuses (or other network apparatuses) 32a1 to 32an and 32b1 to 32bm.

Each of the network apparatuses 30 and 31 and the terminal apparatuses 32a1 to 32an and 32b1 to 32bm includes a transmission apparatus (a transmission apparatus 40, for example) and a reception apparatus (a reception apparatus 41, for example).

Figure 6:
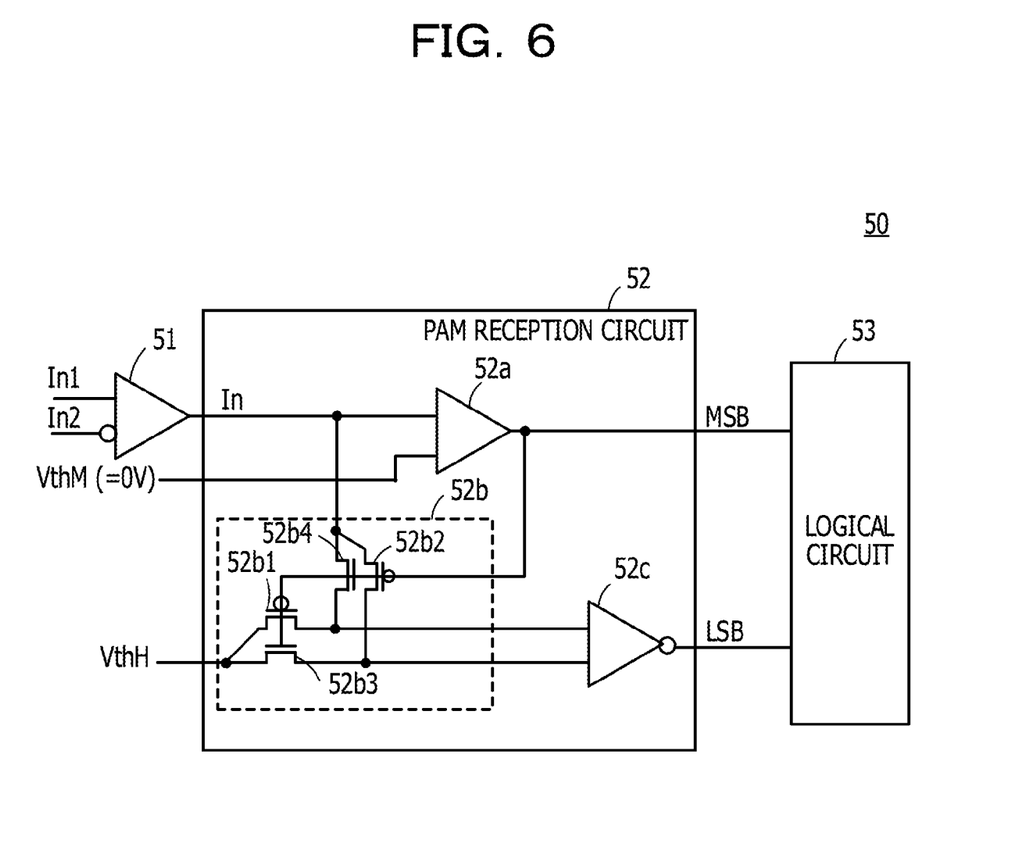
FIG. 6 is a diagram illustrating an example of the reception apparatus according to the second embodiment.

FIG. 6 is a diagram illustrating an example of the reception apparatus according to the second embodiment.

A reception apparatus 50 is included in the network apparatuses 30 and 31 and the terminal apparatuses 32a1 to 32an and 32b1 to 32bm, for example, illustrated in FIG. 5.

The reception apparatus 50 includes a buffer circuit 51, a PAM reception circuit 52, and a logical circuit 53.

The buffer circuit 51 receives a reception signal In2 having a phase opposite to (different by 180 degrees from) a positive phase of a reception signal In1 which is a differential signal of PAM4 and which is transmitted by the transmission apparatus (the transmission apparatus 40 in FIG. 5, for example). Then the buffer circuit 51 outputs a reception signal In which has the same phase as the reception signal In1 and which is obtained by amplifying amplitude of the reception signals In1 and In2.

As with the first embodiment, it is assumed herein that the four potential levels of the reception signal In of PAM4 are denoted by L0, L1, L2, and L3 in ascending order, and "00", "01", "11", and "10" are associated with L0, L1, L2, and L3, respectively. Furthermore, a threshold value of a boundary between L0 and L1 is denoted by VthL, a threshold value of a boundary between L1 and L2 is denoted by VthM, and a threshold value of a boundary between L2 and L3 is denoted by VthH. Note that the threshold value VthM is 0V hereinafter.

The PAM reception circuit 52 includes a comparison circuit 52a, an absolute value circuit 52b, and a comparison circuit 52c.

The comparison circuit 52a outputs an MSB based on a result of a comparison between the reception signal In of PAM4 and the threshold value VthM (=0V). The comparison circuit 52a has a first input terminal which receives the reception signal In and a second input terminal which receives the threshold value VthM. As with the case of the comparison circuit 11a of the PAM reception circuit 11 in FIG. 1, the comparison circuit 52a outputs "1" as an MSB when the reception signal In is larger than the threshold value VthM whereas the comparison circuit 51a outputs "0" as the MSB when the reception signal In is smaller than the threshold value VthM.

The absolute value circuit 52b performs exchange between the reception signal In and the threshold value VthH which are to be supplied to the first and second input terminals of the comparison circuit 52c depending on the MSB which is 0 or 1 output from the comparison circuit 52a. Accordingly, the absolute value circuit 52b is seen to substantially output an absolute value of the reception signal In.

The comparison circuit 52c outputs an LSB based on a result of a comparison between the absolute value output from the absolute value circuit 52b and the threshold value VthH. As with the case of the comparison circuit 11c of the PAM reception circuit 11 in FIG. 1, when the absolute value is larger than the threshold value VthH, the comparison circuit 52c outputs "0" as a second bit value whereas when the absolute value is smaller than the threshold value VthH, the comparison circuit 11c outputs "1" as the second bit value.

When receiving the MSB and the LSB which are results of the determination of the reception signals and which are output from the PAM reception circuit 52, the logical circuit 53 performs various logical calculations.

In the PAM reception circuit 52 of the second embodiment, the absolute value circuit 52b includes p-channel type metal-oxide semiconductor field effect transistors (MOSFETs) 52b1 and 52b2 and n-channel type MOSFETs 52b3 and 52b4. Hereinafter, the P-channel type MOSFET is referred to as pMOS and the n-channel type MOSFET is referred to as nMOS.

The threshold value VthH is supplied to one input/output terminal (a source terminal or a drain terminal) of the pMOS 52b1 and one input/output terminal of the nMOS 52b3. Furthermore, the other input/output terminal of the pMOS 52b1 is connected to a first input terminal of the comparison circuit 52c, and the other input/output terminal of the nMOS 52b3 is connected to a second input terminal of the comparison circuit 52c.

The reception signal In is supplied to one input/output terminal of the pMOS 52b2 and one input/output terminal of the nMOS 52b4. Furthermore, the other input/output terminal of the pMOS 52b2 is connected to the other input/output terminal of the nMOS 52b3 and the second input terminal of the comparison circuit 52c. The other input/output terminal of the nMOS 52b4 is connected to the other input/output terminal of the pMOS 52b1 and the first input terminal of the comparison circuit 52c.

Furthermore, control terminals (gate terminals) of the pMOS 52b1 and 52b2 and control terminals of the nMOS 52b3 and 52b4 are connected to an output terminal of the comparison circuit 52a.

In the absolute value circuit 52b, when the MSB output from the absolute value circuit 52b is "0", the pMOSs 52b1 and 52b2 are turned on and the nMOSs 52b3 and 52b4 are turned off. Therefore, the threshold value VthH is supplied to the first input terminal of the comparison circuit 52c, and the reception signal In is supplied to the second input terminal of the comparison circuit 52c. On the other hand, when the MSB output from the absolute value circuit 52a is "1", the pMOSs 52b1 and 52b2 are turned off and the nMOSs 52b3 and 52b4 are turned on. Therefore, the reception signal In is supplied to the first input terminal of the comparison circuit 52c and the threshold value VthH is supplied to the second input terminal of the comparison circuit 52c.

Specifically, when the reception signal In is larger than the threshold value VthM (=0V), that is, when the reception signal In has a positive voltage, the reception signal In is supplied to the first input terminal of the comparison circuit 52c, and the threshold value VthH is supplied to the second input terminal of the comparison circuit 52c. On the other hand, when the reception signal In is smaller than the threshold value VthM, that is, when the reception signal In has a negative voltage, the reception signal In is supplied to the second input terminal of the comparison circuit 52c and the threshold value VthH is supplied to the first input terminal of the comparison circuit 52c.

In this way, since the reception signal In and the threshold value VthH which are input to the two input terminals of the comparison circuit 52c are switched depending on a positive voltage or a negative voltage of the reception signal In, the comparison result obtained in a case where the absolute value of the reception signal In is compared with the threshold value VthH is similarly obtained.

If the reception signal In is larger than the threshold value VthH when the reception signal In of a positive voltage is supplied to the first input terminal of the comparison circuit 52c and the threshold value VthH is supplied to the second input terminal of the comparison circuit 52c, the comparison circuit 52c outputs "0". Furthermore, when the reception signal In is smaller than the threshold value VthH, the comparison circuit 52c outputs "1".

On the other hand, when the reception signal In of a negative voltage is supplied to the second input terminal of the comparison circuit 52c and the threshold value VthH is supplied to the first input terminal of the comparison circuit 52c, the reception signal In is constantly smaller than the threshold value VthH since the reception signal In has the negative voltage. However, the comparison circuit 52c outputs a comparison result obtained based on the magnitude relationship between a voltage value corresponding to an absolute value of the reception signal In and the threshold value VthH.

When the absolute value of the reception signal In is larger than the threshold value VthH, the comparison circuit 52c outputs "0". When the absolute value of the reception signal In is smaller than the threshold value VthH, the comparison circuit 52c outputs "1".

In this way, the absolute value circuit 52b is seen to output the absolute value of the reception signal In.

Other operations of the PAM reception circuit 52 are the same as those of the PAM reception circuit 11 of the first embodiment, and the PAM reception circuit 52 similarly has the effect of the PAM reception circuit 11.

Note that the absolute value circuit 52b may be realized by a small number of transistors (four in the example of FIG. 6), and a circuit size may be reduced when compared with the PAM reception circuit 20 which employs the three comparison circuits 21 to 23 illustrated in FIG. 3. This is because the comparison circuits 21 to 23 include a large number of transistors.

Figure 7:
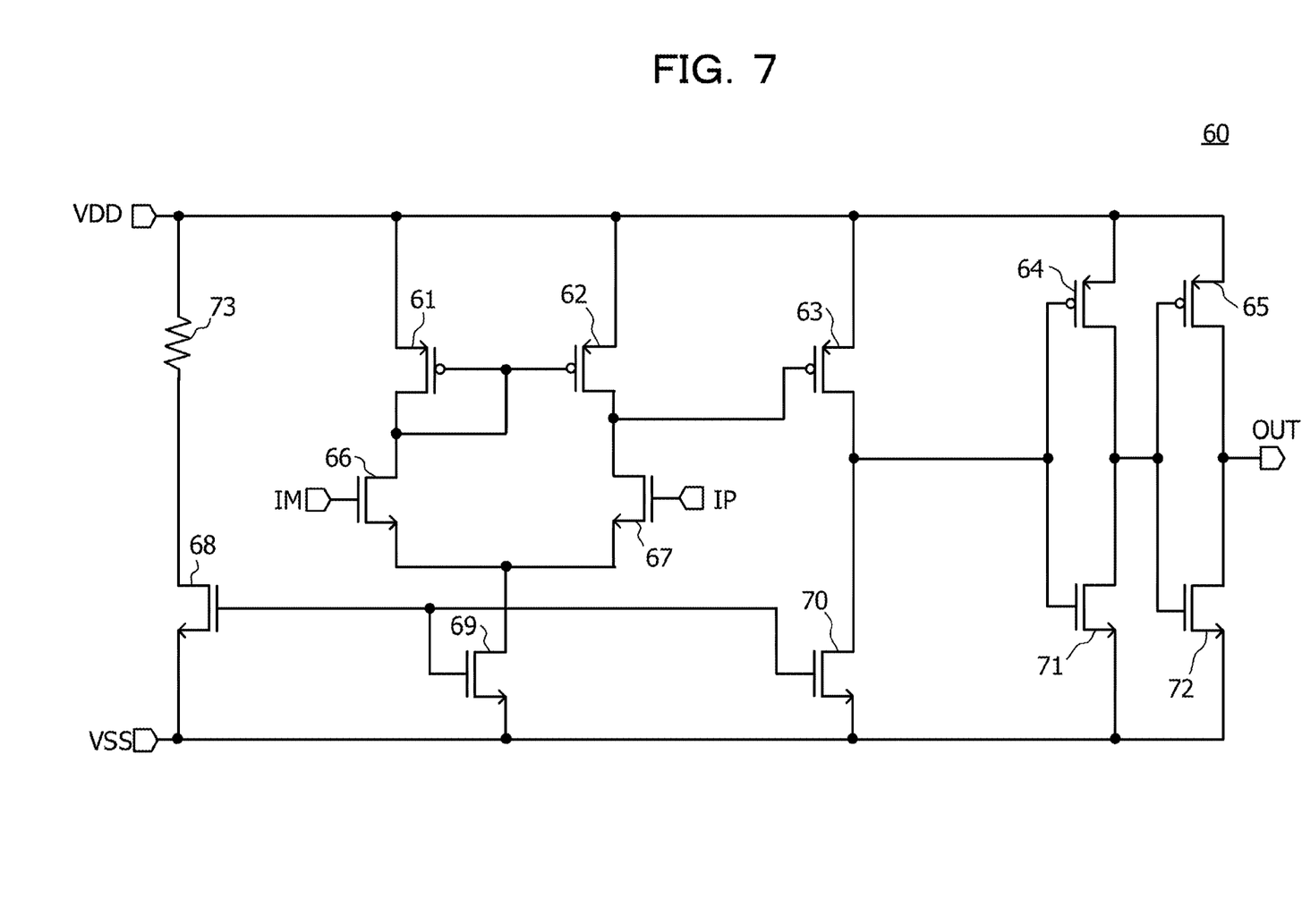
FIG. 7 is a diagram illustrating an example of a comparison circuit.

FIG. 7 is a diagram illustrating an example of a comparison circuit.

A comparison circuit 60 includes pMOS 61 to 65, nMOS 66 to 72, and a resistor 73.

Source terminals of the pMOS 61 to 65 are connected to a power source terminal VDD. Gate terminals of the pMOS 61 and 62 are connected to each other and further connected to a drain terminal of the pMOS 61 and a drain terminal of the nMOS 66. A drain terminal of the pMOS 62 is connected to a gate terminal of the pMOS 63 and a drain terminal of the nMOS 67. A drain terminal of the pMOS 63 is connected to a drain terminal of the nMOS 70 and gate terminals of the pMOS 63 and the nMOS 71. A drain terminal of the pMOS 64 is connected to a drain terminal of the nMOS 71 and gate terminals of the pMOS 65 and the nMOS 72. A drain terminal of the pMOS 65 is connected to a drain terminal of the nMOS 72 and an output terminal OUT.

A gate terminal of the nMOS 66 is connected to an input terminal IM, and a gate terminal of the nMOS 67 is connected to an input terminal IP. Source terminals of the nMOSs 66 and 67 are connected to a drain terminal of the nMOS 69. Source terminals of the nMOS 68 to 72 are connected to a reference power source terminal VSS. A drain terminal of the nMOS 68 is connected to the power source terminal VDD through the resistor 73. Gate terminals of the nMOS 68 to 70 are connected to one another.

In the comparison circuit 60, a voltage of an output terminal OUT corresponds to a voltage supplied from the power source terminal VDD or a voltage supplied from the reference power source terminal VSS (0 V, for example) in accordance with the magnification relationship between voltages of signals supplied to the input terminals IM and IP.

As illustrated in FIG. 7, the comparison circuit 60 includes a large number of transistors (12 transistors in the example of FIG. 7), and therefore, a circuit size is large.

Furthermore, although the comparison circuit 60 consumes electric power of approximately several tens mW, power consumption of the absolute value circuit 52b is negligible since the absolute value circuit 52b is not connected between the power source terminal VDD and the reference power source terminal VSS. Therefore, power saving of the PAM reception circuit 52 and the reception apparatus 50 including the PAM reception circuit 52 is attained.

Note that the threshold value VthL may be used instead of the threshold value VthH. In this case, the pMOSs 52b1 and 52b2 are formed by nMOSs and the nMOSs 52b3 and 52b4 are formed by pMOSs. Alternatively, an inverter circuit which inverts a value of the MSB output from the comparison circuit 52a may be disposed so that an output of the inverter circuit is supplied to gates of transistors included in the absolute value circuit 52b. By this, the comparison circuit 52c outputs an LSB based on a result of a comparison between a value substantially obtained by multiplying the absolute value of the reception signal In by −1 and the threshold value VthL, and accordingly, the effect of the foregoing example using the threshold value VthH may be similarly obtained.

Gray codes are also not limited to the foregoing example.

Third Embodiment

Figure 8:
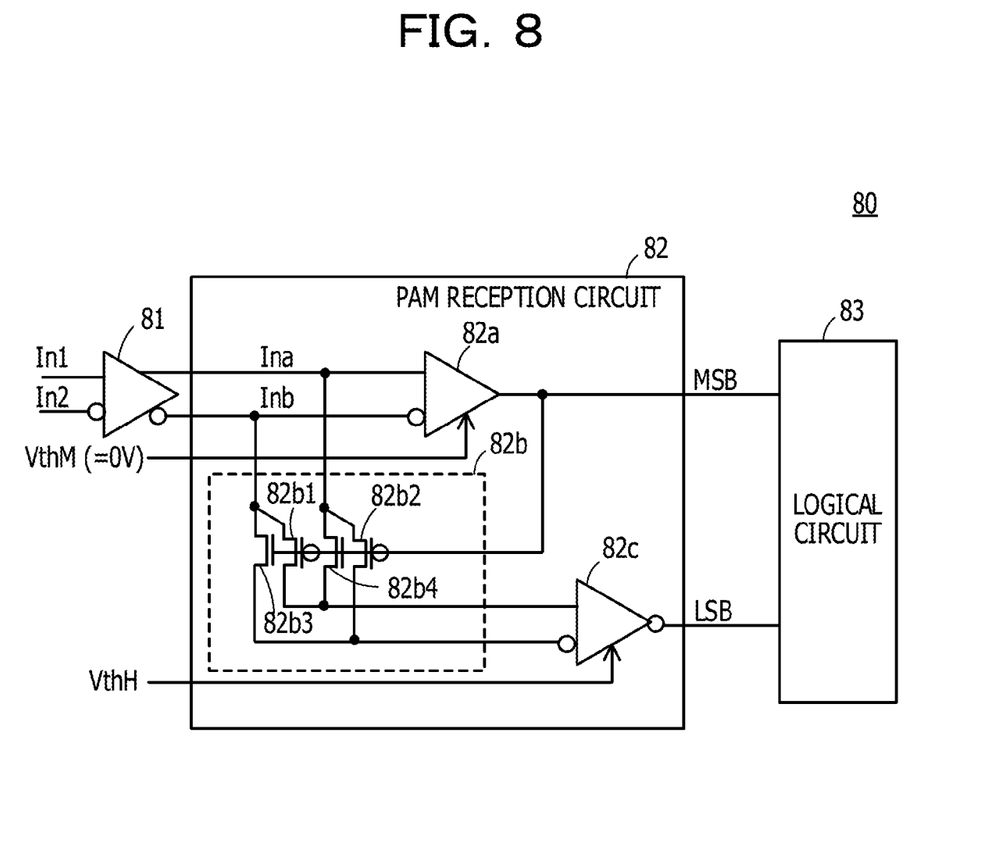
FIG. 8 is a diagram illustrating an example of a reception apparatus according to a third embodiment.

FIG. 8 is a diagram illustrating an example of a reception apparatus according to a third embodiment.

A reception apparatus 80 is included in the network apparatuses 30 and 31 and the terminal apparatuses 32a1 to 32an and 32b1 to 32bm illustrated in FIG. 5.

The reception apparatus 80 includes a buffer circuit 81, a PAM reception circuit 82, and a logical circuit 83.

The buffer circuit 81 receives a reception signal In2 having a phase opposite to a positive phase of a reception signal In1 which is a differential signal of PAM4 and which is transmitted by a transmission apparatus (the transmission apparatus 40 in FIG. 5, for example). Then the buffer circuit 81 outputs a reception signal Ina and a reception signal Inb having a phase opposite to that of the reception signal Ina. The reception signals Ina and Inb have the same phase as the reception signal In1 and are obtained by amplifying amplitude of the reception signals In1 and In2, respectively.

Note that, as with the first embodiment, it is assumed that the four potential levels of the reception signals Ina and Inb of PAM4 are denoted by L0, L1, L2, and L3 in ascending order, and "00", "01", "11", and "10" are associated with L0, L1, L2, and L3, respectively. Furthermore a threshold value of a boundary between L0 and L1 is denoted by VthL, a threshold value of a boundary between L1 and L2 is denoted by VthM, and a threshold value of a boundary between L2 and L3 is denoted by VthH. Note that the threshold value VthM is 0V hereinafter.

The PAM reception circuit 82 includes a comparison circuit 82a, an absolute value circuit 82b, and a comparison circuit 82c.

The comparison circuit 82a outputs an MSB based on a result of a comparison between the reception signal Ina (or a signal obtained by inverting a positive or negative of the reception signal Inb) of PAM4 and the threshold value VthM (=0V). As with the case of the comparison circuit 11a of the PAM reception circuit 11 in FIG. 1, the comparison circuit 82a outputs "1" as the MSB when the reception signal Ina is larger than the threshold value VthM whereas the comparison circuit 82a outputs "0" as the MSB when the reception signal Ina is smaller than the threshold value VthM.

The absolute value circuit 82b supplies the reception signal Ina or Inb to a first input terminal of the comparison circuit 82c in a switching manner depending on 0 or 1 of the MSB output from the comparison circuit 82a. In two signals output from the absolute value circuit 82b, one of the signals corresponds to an absolute value of the reception signal Ina and the other corresponds to a value obtained by multiplying the absolute value by −1.

The comparison circuit 82c receives the absolute value of the reception signal Ina by the first input terminal thereof and receives the value obtained by multiplying the absolute value by −1 by a second input terminal thereof. Note that a value obtained by inverting a sign of the value obtained by multiplying the absolute value by −1 is supplied to the second input terminal (that is, supplied as a positive value). Then the comparison circuit 82c outputs an LSB based on a result of a comparison between the absolute value and the threshold value VthH. Note that, as with the case of the comparison circuit 11c of the PAM reception circuit 11 in FIG. 1, when the absolute value is larger than the threshold value VthH, the comparison circuit 82c outputs "0" as the LSB whereas when the absolute value is smaller than the threshold value VthH, the comparison circuit 11c outputs "1" as the LSB.

The logical circuit 83 performs various logical calculations using the MSB and the LSB which are results of the determination of the reception signal output from the PAM reception circuit 82.

In the PAM reception circuit 82 according to the third embodiment, the absolute value circuit 82b includes pMOSs 82b1 and 82b2 and nMOSs 82b3 and 82b4.

The reception signal Inb is supplied to one input/output terminal (a source terminal or a drain terminal) of the pMOS 82b1 and one input/output terminal of the nMOS 82b3. Furthermore, the other input/output terminal of the pMOS 82b1 is connected to a first input terminal of the comparison circuit 82c, and the other input/output terminal of the nMOS 82b3 is connected to a second input terminal of the comparison circuit 82c.

The reception signal Ina is supplied to one input/output terminal of the pMOS 82b2 and one input/output terminal of the nMOS 82b4. Furthermore, the other input/output terminal of the nMOS 82b4 is connected to a first input terminal of the comparison circuit 82c, and the other input/output terminal of the pMOS 82b2 is connected to a second input terminal of the comparison circuit 82c.

Furthermore, control terminals (gate terminals) of the pMOS 82b1 and 82b2 and control terminals of the nMOS 82b3 and 82b4 are connected to an output terminal of the comparison circuit 82a.

In the absolute value circuit 82b, when the MSB output from the absolute value circuit 82a is "0", the pMOSs 82b1 and 82b2 are turned on and the nMOSs 82b3 and 82b4 are turned off. Therefore, the reception signal Inb is supplied to the first input terminal of the comparison circuit 82c and the reception signal Ina is supplied to the second input terminal of the comparison circuit 82c. On the other hand, when the MSB output from the absolute value circuit 82a is "1", the pMOSs 82b1 and 82b2 are turned off and the nMOSs 82b3 and 82b4 are turned on. Therefore, the reception signal Ina is supplied to the first input terminal of the comparison circuit 82c and the reception signal Inb is supplied to the second input terminal of the comparison circuit 82c.

Specifically, when the reception signal Ina is larger than the threshold value VthM (=0V), that is, when the reception signal Ina has a positive voltage, the reception signal Ina is supplied to the first input terminal of the comparison circuit 82c as an absolute value. Furthermore, the reception signal Inb of a negative voltage is inverted into a signal of a positive voltage and supplied to the second input terminal of the comparison circuit 82c. On the other hand, when the reception signal Ina is smaller than the threshold value VthM, that is, when the reception signal Ina has a negative voltage, the reception signal Inb of the positive voltage is supplied to the first input terminal of the comparison circuit 82c as an absolute value. Furthermore, the reception signal Ina of the negative voltage is inverted into a signal of a positive voltage to be supplied to the second input terminal of the comparison circuit 82c.

In this way, when the reception signal Ina has a positive voltage, the reception signal Ina is supplied to the first input terminal of the comparison circuit 82c as an absolute value whereas when the reception signal Ina has a negative voltage, the reception signal Inb is supplied to the first input terminal as an absolute value. Accordingly, an effect obtained when the absolute value of the reception signal Ina is compared with the threshold value VthH is similarly obtained.

For example, the comparison circuit 82c outputs "0" when the absolute value of the reception signal Ina of the negative voltage is larger than the threshold value VthH and outputs "1" when the absolute value is smaller than the threshold value VthH.

Other operations of the PAM reception circuit 82 are the same as those of the PAM reception circuit 11 of the first embodiment, and the PAM reception circuit 82 similarly has the effect of the PAM reception circuit 11.

Note that the absolute value circuit 82b may be realized by a small number of transistors (four in the example of FIG. 8), and a circuit size may be reduced when compared with the PAM reception circuit 20 which employs the three comparison circuits 21 to 23 illustrated in FIG. 3.

Furthermore, power consumption of the absolute value circuit 82b is negligible since the absolute value circuit 82b is not connected between the power source terminal VDD and the reference power source terminal VSS. Therefore, power saving of the PAM reception circuit 82 and the reception apparatus 80 including the PAM reception circuit 82 is attained.

Note that the threshold value VthL may be used instead of the threshold value VthH. In this case, the pMOSs 82b1 and 82b2 are formed by nMOSs and the nMOSs 82b3 and 82b4 are formed by pMOSs. Alternatively, an inverter circuit which inverts a value of the MSB output from the comparison circuit 82a may be disposed so that an output of the inverter circuit is supplied to gates of transistors included in the absolute value circuit 82b. By this, the comparison circuit 82c outputs the LSB based on a result of a comparison between a value substantially obtained by multiplying the absolute value of the reception signal In by −1 and the threshold value VthL, and accordingly, the effect of the foregoing example using the threshold value VthH is similarly obtained.

Gray codes are also not limited to the foregoing example.

Another Example of Reception Apparatus

As described above, the threshold value VthL may be used instead of the threshold value VthH.

Figure 9:
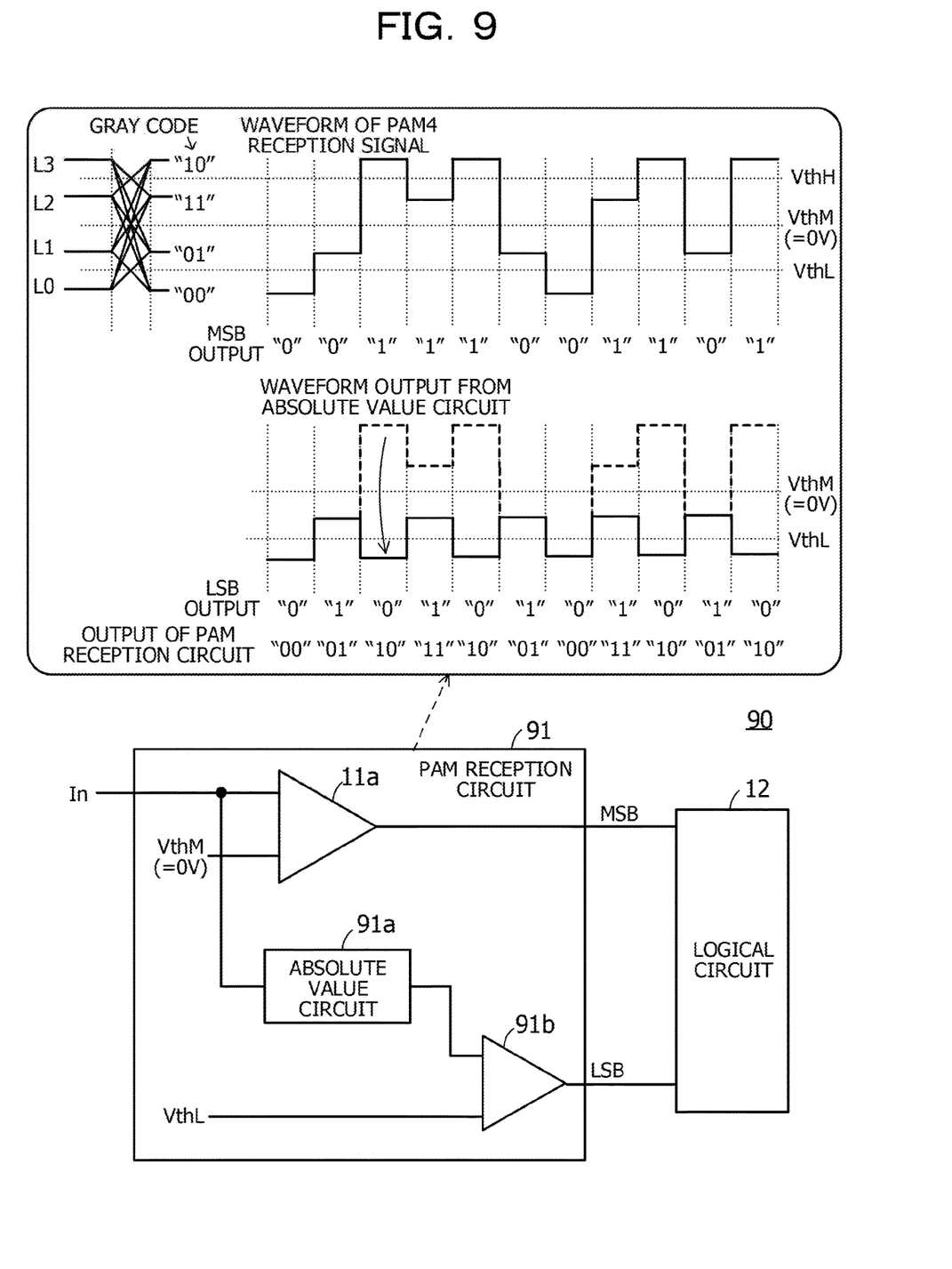
FIG. 9 is a diagram illustrating an example of a PAM reception circuit and an example of a reception apparatus employing a threshold value VthL.

FIG. 9 is a diagram illustrating an example of a PAM reception circuit and an example of a reception apparatus employing a threshold value VthL. In FIG. 9, components the same as those in FIG. 1 are denoted by reference numerals the same as those in FIG. 1.

In a reception apparatus 90, an absolute value circuit 91a of a PAM reception circuit 91 outputs a negative value obtained by inverting a positive sign of an absolute value of a difference between a reception signal In and the threshold value VthM into a negative sign. In FIG. 9, a waveform of the reception signal In illustrated in FIG. 1 and an output waveform of the absolute value circuit 91a are illustrated. The output waveform of the absolute value circuit 91a is obtained by inverting a waveform of the reception signal In in a positive voltage into a negative voltage.

A comparison circuit 91b has a first input terminal to which a negative value is supplied from the absolute value circuit 91a. Furthermore, the comparison circuit 91b has a second input terminal to which the threshold value VthL is supplied. When the negative value output from the absolute value circuit 91a is smaller than the threshold value VthL, the comparison circuit 91a outputs "0" as an LSB whereas when the negative value is larger than the threshold value VthL, the comparison circuit 91a outputs "1" as an LSB.

Accordingly, an effect of the foregoing example using the threshold value VthH is similarly obtained.

Note that, in the absolute value circuit 52b illustrated in FIG. 6, for example, when the threshold value VthH is replaced by the threshold value VthL, the pMOSs are replaced by the nMOSs, and the nMOSs are replaced by the pMOSs, a function of the absolute value circuit 91a illustrated in FIG. 9 is similarly realized. Furthermore, in the absolute value circuit 82b illustrated in FIG. 8, when the threshold value VthH is replaced by the threshold value VthL, the pMOSs are replaced by the nMOSs, and the nMOSs are replaced by the pMOSs, a function of the absolute value circuit 91a illustrated in FIG. 9 is similarly realized.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A PAM reception circuit comprising:
   a first comparison circuit that outputs a first bit value in two-bit values based on a result of a comparison between a reception signal of pulse amplitude modulation 4 in which the two-bit values are associated with four potential levels divided by three threshold values by gray codes and a first threshold value which is a center of the three threshold values;
   an absolute value circuit that outputs an absolute value of a difference between the reception signal and the first threshold value or a negative value obtained by inverting a sign of the absolute value from a positive sign to a negative sign; and
   a second comparison circuit that outputs a second bit value in the two-bit values based on a result of a comparison between a second threshold value which is larger than the first threshold value in the three threshold values and the absolute value or a result of a comparison between a third threshold value which is smaller than the first threshold value in the three threshold values and the negative value.

2. The PAM reception circuit according to claim 1,
   wherein the first comparison circuit outputs 1 as the first bit value when the reception signal is larger than the first threshold value and outputs 0 as the first bit value when the reception signal is smaller than the first threshold value, and
   the second comparison circuit outputs 0 as the first bit value when the absolute value is larger than the second threshold value or when the negative value is smaller than the third threshold value and outputs 1 when the absolute value is smaller than the second threshold value or when the negative value is larger than the third threshold value.

3. The PAM reception circuit according to claim 2,
   wherein, in the four potential levels, when the two-bit value associated with the first potential level which is lowest is 00, the two-bit value associated with a second potential level which is higher than the first potential level is 01, the two-bit value associated with a third potential level which is higher than the second potential level is 11, and the two-bit value associated with the fourth potential level which is higher than the third potential level is 10, the first bit value is a most significant bit (MSB) and the second bit value is a least significant bit (LSB).

4. The PAM reception circuit according to claim 1,
   wherein the absolute value circuit performs exchange between the reception signal and the second threshold value or the third threshold value which are to be supplied to the first and second input terminals of the second comparison circuit depending on the first bit value of 0 or 1.

5. The PAM reception circuit according to claim 1,
   wherein the reception signal includes a first reception signal and a second reception signal having a phase which is different by 180 degrees from the first reception signal, and
   the absolute value circuit performs switching between the first reception signal and the second reception signal to be supplied to a first input terminal of the second comparison circuit depending on the first bit value of 0 or 1.

6. The PAM reception circuit according to claim 1,
   wherein the first threshold value is 0V.

7. A reception apparatus comprising:
   a PAM reception circuit including
     a first comparison circuit that outputs a first bit value in two-bit values based on a result of a comparison between a reception signal of four-value pulse amplitude modulation in which the two-bit values are associated with four potential levels divided by three threshold values by gray codes and a first threshold value which is a center of the three threshold values,
     an absolute value circuit that outputs an absolute value of a difference between the reception signal and the first threshold value or a negative value obtained by inverting a sign of the absolute value from a positive sign to a negative sign, and
     a second comparison circuit that outputs a second bit value in the two-bit values based on a result of a comparison between a second threshold value which is larger than the first threshold value in the three threshold values and the absolute value or a result of a comparison between a third threshold value which is smaller than the first threshold value in the three threshold values and the negative value; and
   a logical circuit which performs a logical calculation using one the first and second bit values as an MSB and the other of the first and second bit values as an LSB.

* * * * *